April 29, 1941.  J. H. STERNBERGH  2,240,425
FASTENER
Filed July 31, 1939
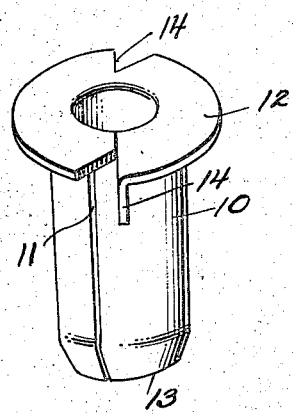
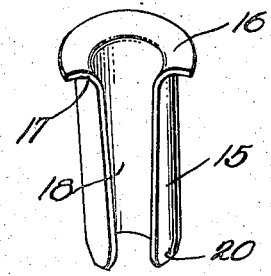
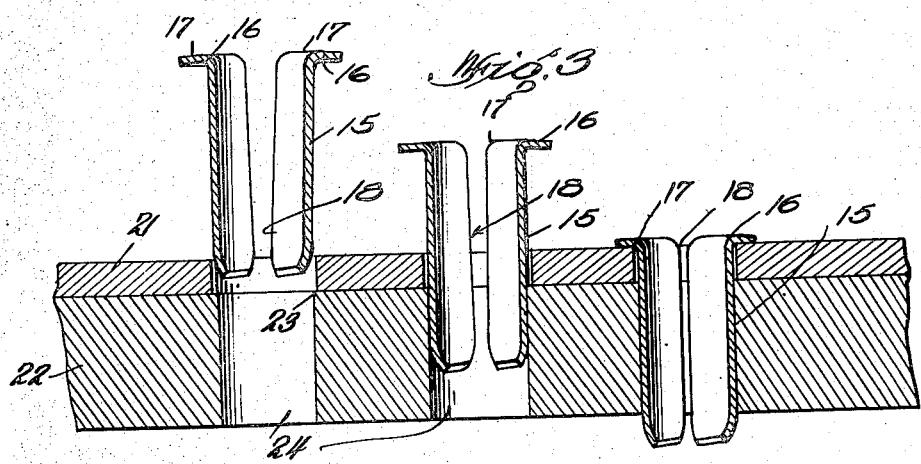
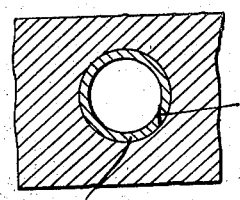
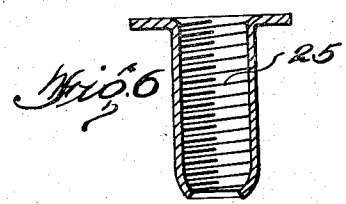
Inventor
J. H. Sternbergh
By Blair Kilcoyne
Attorneys

Patented Apr. 29, 1941

2,240,425

UNITED STATES PATENT OFFICE 2,240,425

FASTENER

James Hervey Sternbergh, Reading, Pa.

Application July 31, 1939, Serial No. 287,627

6 Claims. (Cl. 72—105)

This invention relates to fasteners, and more particularly to a fastener or device adapted to secure one member to another as, for example, a sheet metal part to a concrete wall.

One of the objects of the present invention is to provide a simple, self-contained article which may be quickly positioned with respect to a plate and a wall, for example, securing the plate to the wall by a simple hammering action as one would drive a nail.

Another object is to provide a device of the above character, requiring no special tools other than a drill and a hammer, and requiring no elaborate machine work either on the fastener or the hole in which the fastener is positioned.

A further object is to provide a device of the above character adapted to have substantially uniform holding qualities throughout its surface area, irrespective of minor variations in hole dimensions or form.

A further object is to provide a fastener of the above character, or any desired size, and which may have a relatively large range of applicability as to the size of holes in which it is used and the kinds of material secured.

Other objects will be in part obvious from the annexed drawing and in part hereinafter indicated in connection with the following analysis of this invention.

This invention accordingly consists in the features of construction, combination of parts and in the unique relation of the members and in the relative proportioning and disposition thereof, all as more completely outlined herein.

To enable others, skilled in the art, fully to comprehend the underlying features of this invention and the numerous modifications in structure and relation contemplated thereby, a drawing depicting two of various possible embodiments of the invention have been annexed, as part of this disclosure, and in such drawing like characters of reference denote corresponding parts throughout all of the views, in which—

Fig. 1 is a perspective view of one form of the fastener;

Fig. 2 is a similar view of a slightly modified form;

Fig. 3 is a detail view, partly in section, showing the three relative positions of the fastener before, during and after application;

Fig. 4 is a detail, cross-sectional view of the device shown in either Fig. 1 or Fig. 2;

Fig. 5 is a similar view of the device in applied position;

Fig. 6 illustrates one way in which the interior of the fastening may be roughened or screw-threaded for certain purposes.

This fastening device is preferably constructed from any desired "live" metal or alloy such as spring steel, because of its relative inexpensiveness, strength and resiliency. The resiliency of the material is important as the holding qualities depend to a large extent upon such resiliency.

This fastening device is applicable for securing together any two pieces of material, that is, two pieces of metal, or metal to concrete, or wood to metal, etc. In fact it has a variety of applications. It has been found, however, to be especially applicable in securing metal trim, door-frames, etc., to concrete walls in modern, fireproof buildings.

Referring now to Fig. 1, 10 indicates the main body portion of the fastening device, which is of cylindrical shape throughout the major part of its length, that is, probably seven-eighths of the total length of the fastener, and is provided, along one side, with an opening or slot 11. Thus, the resilient material permits a relative contraction of the body portion 10 in its application to the parts in assembling. The outer, head end or front portion of the body is provided with an outwardly extending flange, 12, integral with the body portion and adapted to provide a reinforcing and gripping head. This accomplishes several purposes, namely, it increases the strength of the device and provides a better hitting surface, for driving; reduces the danger of splitting the tubular body portion by striking the head; and further provides a secure holding means for the plate or part as applied. This is particularly noticeable where the hole in one member is materially larger than the hole in the other, for the head or flange 12 will then hold the parts in assembled relation. The pointed or tapered end of the device permits easy insertion, leaving the major part of the body portion to act uniformly upon the interior surface of the hole, thereby giving the maximum holding effect.

The opposite end of this body portion 10 is tapered or reduced in diameter as indicated at 13 thereby to increase ease of assembly. It will be noted also that the head 12 may be provided with one or more inwardly projecting points 14, when desired, for the purpose of penetrating wood or relatively soft material, thereby further to prevent relative turning of the fastener when finally applied.

In Fig. 2 substantially the same construction is illustrated except that the body portion 15 while still substantially cylindrical preferably has a very slight taper. The head 16 may be slightly curved in cross-section, as indicated in 17, to increase the strength of and to provide a more ornamental exposed surface. The slot 18 is wider than the slot 11, shown in Fig. 1 and its width before insertion is not uniform; in other words, it is also slightly wider opposite the point of greater diameter of the body portion as is evident from an inspection of the exaggerated showing in Fig. 3, thereby providing greater flexibility in application of the device, while the opposite end 20 is tapered to increase ease of entry into holes in assembly.

Referring to Fig. 3, which shows three stages of application, a device such as shown in Fig. 2 is about to be inserted, in registering openings, through a member 21 which may be considered as a plate or a part of a metal door-frame or other item, and with the concrete wall 22. The registering openings 23 and 24 are slightly different in size, the opening in the metal plate being slightly larger than the other, thereby to assist in squeezing or contracting the body member 15 and reducing the width of the slot 18 as the device enters the second opening 24. The cylindrical opening 24 in the concrete has been previously drilled or formed in any desired manner and is of a size or diameter smaller than the natural size of the unapplied fastener, thereby tending to close the slot 18 when the fastener is applied to obtain maximum contact and efficiency in the fastening.

When the fastener is positioned as shown at the extreme left of Fig. 3, a tap or two with a hammer, as one would drive a nail, will start this fastener in the holes, to the position shown in the central part of Fig. 3, while the subsequent blow will drive it home, as shown at the extreme right of Fig. 3. This is all that is required in applying and assembling the parts. It will be noted, as shown at the extreme right of Fig. 3, that the slot 18 is reduced to practically a line contact and the natural expansion of the fastener, tending to restore this slot 18 to its original width, as shown at the left of Fig. 3, will exert great pressure against the interior of the holes, uniformly and throughout substantially its entire surface area, thereby resisting a pull of several hundred pounds against its withdrawal.

The adjacent edges of the slot 18, as shown in Fig. 4, may be beveled so that should the device be applied to a hole smaller than intended, the adjacent edges will slide past each other as shown in Fig. 5. Again, the interior of the fastener may be threaded as shown at 25 in Fig. 6, as another means to permit a screw hook, for example, to be threaded into this fastener when desired.

The present embodiment has been illustrated and described as being made of sheet metal, for it has been found that when made of such material the devices can be stamped out very rapidly and at low cost. However, the fastener could be made in other ways and of other materials, even to the extent of boring and slotting a solid piece.

The construction involved and its method of use and operation have already been described and further explanation is unnecessary.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention and therefore such adaptations should and are intended to be comprehended within the meaning and range of equivalency of the following claims.

I claim:

1. A fastener of the character described especially adapted to hold two flat members having registering openings in fixed relation, comprising a substantially cylindrical but slightly tapering resilient sheet metal body portion, said body portion having a relatively wide slot extending through the length thereof, said slot being slightly wider at the end of greater diameter whereby when said fastener is driven through the registering openings the slot will be substantially closed, thereby to provide maximum frictional contact between the outer wall of the fastener and the adjacent walls of the holes in said flat members, and an outwardly flanged head at one end of said body portion.

2. A fastener as set forth in claim 1, in which the outwardly flanged head is slightly curved in cross-section.

3. A fastener as set forth in claim 1, in which the longitudinal slot is provided with oppositely beveled adjacent edges.

4. A fastener as set forth in claim 1, in which the interior surface of the body member is roughened.

5. A fastener as set forth in claim 1, in which the interior surface of the body portion is screw-threaded.

6. A fastener as set forth in claim 1, in which the smaller end of the body portion has a further slight taper thereby to permit the fastener to be inserted more readily.

JAMES HERVEY STERNBERGH.